US012737404B2

(12) United States Patent
Panikkar et al.

(10) Patent No.: US 12,737,404 B2
(45) Date of Patent: Sep. 15, 2026

(54) OPTIMIZED RETRIEVAL-AUGMENTED GENERATION FOR COMPLEX DOCUMENTS

(71) Applicant: Dell Products L.P., Round Rock, TX (US)

(72) Inventors: Shibi Panikkar, Bangalore (IN); Susana Cherian, Trivandrum (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 19/028,236

(22) Filed: Jan. 17, 2025

(65) Prior Publication Data

US 2026/0211920 A1 Jul. 23, 2026

(51) Int. Cl.
*G06F 16/334* (2025.01)
*G06F 16/22* (2019.01)

(52) U.S. Cl.
CPC ...... *G06F 16/3347* (2019.01); *G06F 16/2282* (2019.01)

(58) Field of Classification Search
CPC ........... G06F 16/24578; G06F 16/3347; G06F 16/2282
USPC .......................................................... 707/741
See application file for complete search history.

(56) References Cited

U.S. PATENT DOCUMENTS

2024/0370660 A1* 11/2024 Cha .......................... G06T 11/00
2025/0165463 A1* 5/2025 Brenner ................ G06F 16/242
2025/0238433 A1* 7/2025 Sussman ................ G06Q 10/10

* cited by examiner

*Primary Examiner* — Hung T Vy
(74) *Attorney, Agent, or Firm* — Amin, Turocy & Watson, LLP

(57) ABSTRACT

The subject technology relates to optimized retrieval-augmented generation (RAG) for complex documents. An example method includes generating partial vector embeddings from a document, the partial vector embeddings being representative of respective defined sections of the document; assigning a data block, including a representation of tabular data present in the document, to a partial vector embedding, of the partial vector embeddings and corresponding to a section, of the defined sections of the document, in which the tabular data appears; and generating, in response to an input query to a machine learning model, a query output based on selected output data, where the selected output data includes selected vector embeddings, of a group of vector embeddings that includes the partial vector embeddings, and the data block, and where the selected vector embeddings are selected based on a relevancy criterion and a data size constraint of the machine learning model.

20 Claims, 14 Drawing Sheets

500

| med_id | med_adm | supplier | dosage | exp_side | exp_out |
|---|---|---|---|---|---|
| 111 | XXX | SUP1 | 5 ml | rash | rash |
| 222 | YYY | SUP2 | 5 ml | headache | rash |

502

| | med_id | Shift | Pt_ID | Pt_ name | Pt_stat | Location | Gender | Check-ins | | |
|---|---|---|---|---|---|---|---|---|---|---|
| | | | | | | | | Rash | Fever | Headache |
| Trial1 | 111 | Morning | 1 | AAA | | TX | M | × | × | × |
| Trial2 | 222 | Morning | 2 | BBB | | AL | F | ✓ | × | × |
| Trial3 | 111 | Evening | 3 | CCC | | FL | F | ✓ | ✓ | ✓ |
| | 111 | Morning | 4 | DDD | | HI | M | × | × | × |
| Trial4 | 111 | Evening | 4 | FFF | | HI | M | × | × | × |

FIG. 5

OPTIMIZED RETRIEVAL-AUGMENTED GENERATION FOR COMPLEX DOCUMENTS

BACKGROUND

Retrieval-augmented generation (RAG) is a technique that can improve responses provided by a large language model (LLM) or other machine learning model by augmenting a model-produced response with information retrieved from a document or other external information source. Documents processed by RAG systems can range from simple documents containing only text and images to data-rich documents containing complex tables or other data structures.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include at least one processor and at least one memory that stores executable instructions that, when executed by the at least one processor, facilitate performance of operations. The operations can include generating partial embeddings from a document, the partial embeddings being representative of respective subdivisions of the document. The operations can further include assigning a data block, including a representation of tabular data present in the document, to a partial embedding, of the partial embeddings and corresponding to a subdivision, of the subdivisions of the document, in which the tabular data appears. The operations can additionally include, in response to an input query to a machine learning (ML) model, generating a query output based on selected output data including selected embeddings, of a group of embeddings and including the partial embedding, and the data block. The selected embeddings can be selected based on a relevancy criterion and a data size constraint of the ML model.

In another implementation, a method is described herein. The method can include generating, by a system including at least one processor, partial vector embeddings from a document, the partial vector embeddings being representative of respective defined sections of the document. The method can also include assigning, by the system, a data block, including a representation of tabular data present in the document, to a partial vector embedding, of the partial vector embeddings and corresponding to a section, of the defined sections of the document, in which the tabular data appears. The method can further include generating, by the system and in response to an input query to an ML model, a query output based on selected output data. The selected output data can include selected vector embeddings, of a group of vector embeddings that includes the partial vector embeddings, and the data block. The selected vector embeddings can be selected based on a relevancy criterion and a data size constraint of the ML model.

In an additional implementation, a non-transitory machine-readable medium is described herein that can include instructions that, when executed by at least one processor, facilitate performance of operations. The operations can include generating partial embedding vectors corresponding to a document, the partial embedding vectors being representative of respective defined sections of the document; assigning a data block, including a representation of tabular data present in the document, to a partial embedding vector, of the partial embedding vectors and corresponding to a section, of the defined sections of the document, in which the tabular data appears; and generating, in response to an input query being provided to a machine learning model, a query output based on selected output data, wherein the selected output data includes selected embedding vectors, of a group of embedding vectors that includes the partial embedding vectors, and the data block, and wherein the selected embedding vectors are selected based on a relevancy criterion and a data size constraint of the machine learning model

DESCRIPTION OF DRAWINGS

Various non-limiting embodiments of the subject disclosure are described with reference to the following figures, wherein like reference numerals refer to like parts throughout unless otherwise specified.

FIG. 5 is a diagram illustrating example complex tabular data that can be processed by various implementations described herein.

DETAILED DESCRIPTION

Figure 1:
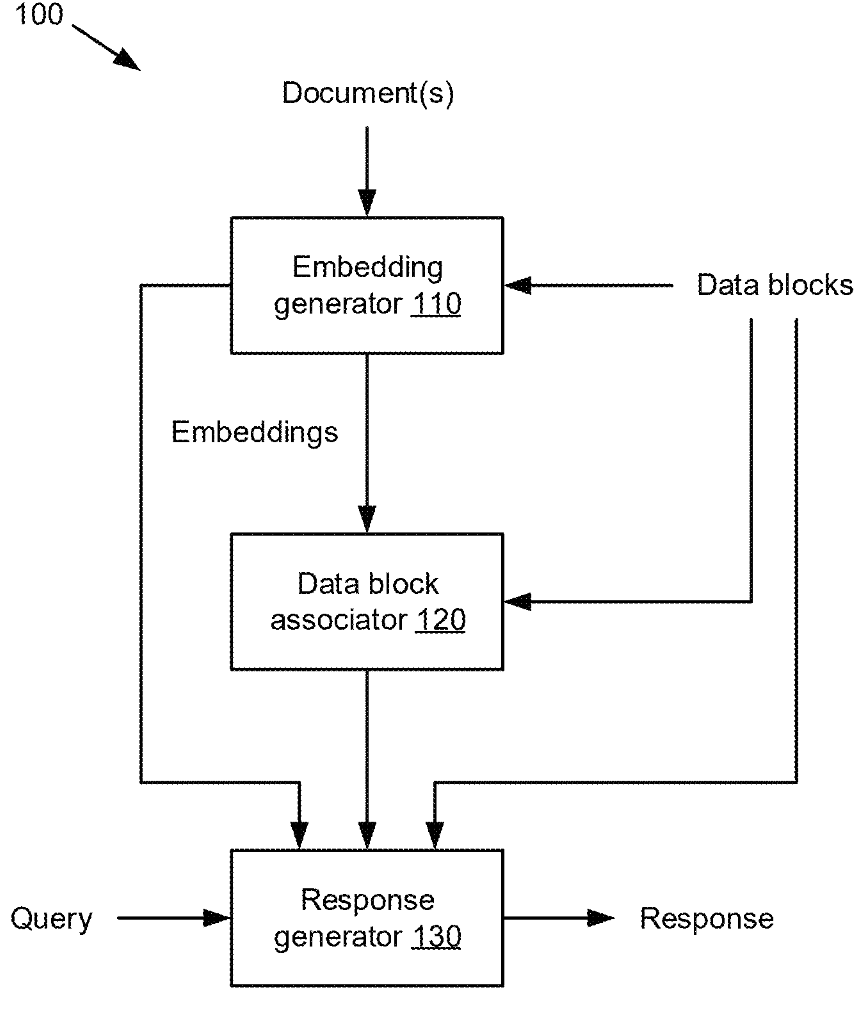
FIGS. 1-2 are block diagrams of respective systems that facilitate optimized retrieval-augmented generation (RAG) for complex documents in accordance with various implementations described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Various implementations described herein relate to techniques for ensuring accurate and contextually relevant responses from a large language model (LLM) operating in a retrieval-augmented generation (RAG) system. While some implementations described herein relate to particular use cases, it is noted that these implementations are intended merely as non-limiting examples and are not intended to limit the scope of the description or the claimed subject matter to any specific use case(s) unless explicitly stated otherwise.

Enterprise organizations widely rely on RAG to leverage LLMs for generative artificial intelligence (AI) by vectorizing documents in various formats. While most of these documents contain only text and images, some documents (e.g., annual reports, customer satisfaction (CSAT) reports, etc.) can contain complex tabular data, e.g., within tables that can include nested tables, colored legends, or the like. Existing general-purpose LLM embedders are effective for most tasks, but they often encounter challenges when dealing with complex tables, charts, and nested tables within documents.

At a high level, general-purpose embedding and semantic search encounters challenges in several scenarios, such as the following:

Inter-table relationships: Difficulty often arises in resolving relationships between parent and child tables located in different sections of the same document. While these relationships are often specified in the text of the document, general-purpose embedders generally have difficulties in discerning them.

Large tables and long content: Issues can arise when tables are large or cells contain extensive text, which can exceed the embedding window (e.g., in terms of token size or the like) and result in loss of association with the table header.

Merged cells and columns: Complications can occur with merged cells or columns in a table, leading to a loss of data relationships or the potential for creation of false relationships.

Cell color: General-purpose embedding can miss contextual information due to cell color, which is generally not captured in embeddings.

Images in cells: Loss of window, relationship, and/or context can occur when images (e.g., emojis or other symbols) are included in table cells.

Headers and non-intuitive tables: Challenges can present with tables lacking headers or using non-intuitive headers (e.g., Pt_ID instead of patient ID), especially when data sources report directly to the table.

Group headings and row headers: A general-purpose embedder can experience difficulty in maintaining relationships due to complex group headings, sub-headings, or row headers.

Absence of headers: Tables without headers can make it challenging for a general-purpose embedder to derive context.

These and/or other issues can significantly impact the effectiveness of semantic search and embeddings in capturing and leveraging the relational and contextual information available within a given document. In addition, in data-rich documents (such as annual financial reports or the like), general purpose embeddings often do not provide value information (VI) in a reliable manner. For instance, if a report is divided into multiple documents, the chance of loss of data for a given query relating to those documents increases. As an example, consider an embedding of six documents related to a finance report where only a subset of those documents can be selected to respond to a query. In such an example, if a customer submits an inquiry for information in the report, and this information is distributed across documents 3, 5, and 6 of the report as tables, an LLM that is limited to three documents due to token size constraints may select documents 1, 2, and 3 instead. As a result, only the partial relevant details from document 3 are included in the response, while information provided in tabular format in documents 5 and 6 are excluded. This, in turn, can lead to an incomplete and potentially inaccurate response.

To the furtherance of the above and/or related ends, various implementations described herein provide techniques for capturing tables and charts in documents in an optimized manner that preserves context and relationships, e.g., using general-purpose embedders along with mathematical modeling techniques and meta-tagging to optimize the document content that is passed for a specific query to improve query responses in systems that use large document embeddings. As a result, various implementations described herein can enable more accurate responses from LLMs to natural language queries.

As noted above, existing general-purpose embeddings and semantic search methods are not optimal for documents containing tables and charts that can potentially be complex and/or distributed across different sections. As a result, the embedded representations of these documents often lose relational information, leading to inaccurate or irrelevant search results and responses from LLMs when queried in natural language. This limitation, in turn, hampers the ability to derive meaningful insights from complex documents with structured data. Various implementations described herein can provide improvements to conventional RAG processes in at least the following ways:

Handling structured data: Existing RAG systems are not well-equipped to process structured data, such as tables and charts, in a document along with text content. Various implementations as described herein can fill this gap by normalizing and transforming such data into a format that LLMs can better understand.

Semantic understanding of visual elements: Current systems lack the capability to interpret color-coded indicators and chart data effectively. Various implementations as described herein can use methods to convert these visual elements into descriptive text and metadata, enhancing LLM understanding.

Contextual retrieval accuracy: Existing RAG approaches often overlook the importance of context in hierarchical and visual data retrieval. Various implementations as described herein can use attention mechanisms and contextual chunking to improve retrieval accuracy for complex documents.

Data retrieval based on context windows: Existing approaches may take the first few available documents for a query, which may not be relevant for the query. Various implementations as described herein can utilize smart scope selection and/or other techniques to improve the relevance of retrieved materials.

In addition, it is noted that implementations described herein can provide solutions to technical problems that are inextricably tied to computer systems, such as analyzing and facilitating responses to queries provided to an LLM, managing the vector embedding and retrieval of documents from a knowledge base or other document store that could contain large numbers of documents (e.g., on the order of thousands of documents or more), determining the quality of those retrieved documents in relation to a query in real time, or the like, in addition to providing those solutions in a manner that cannot reliably be performed by humans. For instance, due to the speed at which a computer processes data, the amount of data that can be processed by a computer in parallel, the timeframe in which a computer processes data, and/or other factors, it is not possible for a human to conduct and oversee embedding or retrieval of documents from a knowledge base or other document store at the timescale in which a typical LLM process is executed.

With reference now to the drawings, FIG. 1 illustrates a block diagram of a system 100 that facilitates optimized RAG for complex documents in accordance with various implementations described herein. System 100 as shown in FIG. 1 includes executable components, e.g., an embedding generator 110, a data block associator 120, and a response generator 130, each of which can operate as described in further detail below. In an implementation, the components 110, 120, 130 of system 100 can be implemented in hardware, software, or a combination of hardware and software. By way of example, the components 110, 120, 130 can be stored on at least one memory and executed by at least one processor. An example of a computer architecture including a processor and memory that can be used to implement the components 110, 120, 130, as well as other components as will be described herein, is shown and described in further detail below with respect to FIG. 15. In some implementations, the executable components 110, 120, 130 of system 100, and/or other elements of system 100, can communicate with each other via a bus and/or other components that provide intercommunication between various elements of system 100.

Additionally, it is noted that the functionality of the respective components shown and described herein can be implemented via a single computing device and/or a combination of devices. For instance, in various implementations, the embedding generator 110 shown in FIG. 1 could be implemented via a first device, the data block associator 120 could be implemented via the first device or a second device, and the response generator 130 could be implemented via the first device, the second device, or a third device. Also, or alternatively, the functionality of a single component could be divided among multiple devices in some implementations.

As will be described in further detail below, the components 110, 120, 130 of system 100 can be utilized to interact with an RAG system and/or an associated LLM or other machine learning (ML) model to provide responses to user queries based on documents and/or other information sources. In some implementations, one or more of the components 110, 120, 130 of system 100 can be implemented on the same computing device(s) on which the RAG system and/or or the document(s) reside. In other implementations, the RAG system and/or document(s) can be maintained separately from system 100, and the components 110, 120, 130 of system 100 can interact with the RAG system via any suitable wired or wireless communication technology or combination of technologies.

In some implementations described herein, an RAG system and/or portions of the response generator 130 can be implemented via an LLM, which, e.g., can be a pre-trained model that operates independently from system 100 such that the components 110, 120, 130 of system 100 do not have direct control over the operation of the LLM outside of the ability to direct the LLM to generate a response to a given query based on information retrieved by an associated RAG system as described herein. In other implementations, system 100 as shown in FIG. 1 could be implemented within an LLM itself. Additionally, with respect to the description that follows, it is noted that any specific reference to particular models or model types are provided merely as examples and are not intended to be limiting on the description or the claimed subject matter unless explicitly stated otherwise.

With reference now to the components of system 100, the embedding generator 110 can generate partial embeddings (e.g., vector embeddings) from a document. These partial embeddings can be representative of respective subdivisions (e.g., sections, etc.) of the document. Various operations that can be performed by the embedding generator 110 are described in further detail below with respect to FIGS. 7-8.

The data block associator 120 can assign a data block, which can be and/or otherwise include a representation of tabular data (i.e., data present in one or more tables or charts) of the document, to a partial embedding generated by the embedding generator 110 that corresponds to a subdivision of the document in which the tabular data associated with the data block appears.

The response generator 130, in response to an input query being directed to an ML model (e.g., an LLM), can generate a query output based on selected output data that includes selected embeddings generated by the embedding generator 110 (e.g., which can include partial embeddings as described above) and one or more data blocks that have been associated with the selected embeddings by the data block associator 120. In an implementation, the response generator can select these selected embeddings based on a relevancy criterion and a data size constraint of the ML model, e.g., as will be described in further detail below with reference to FIGS. 11-12.

Figure 2:
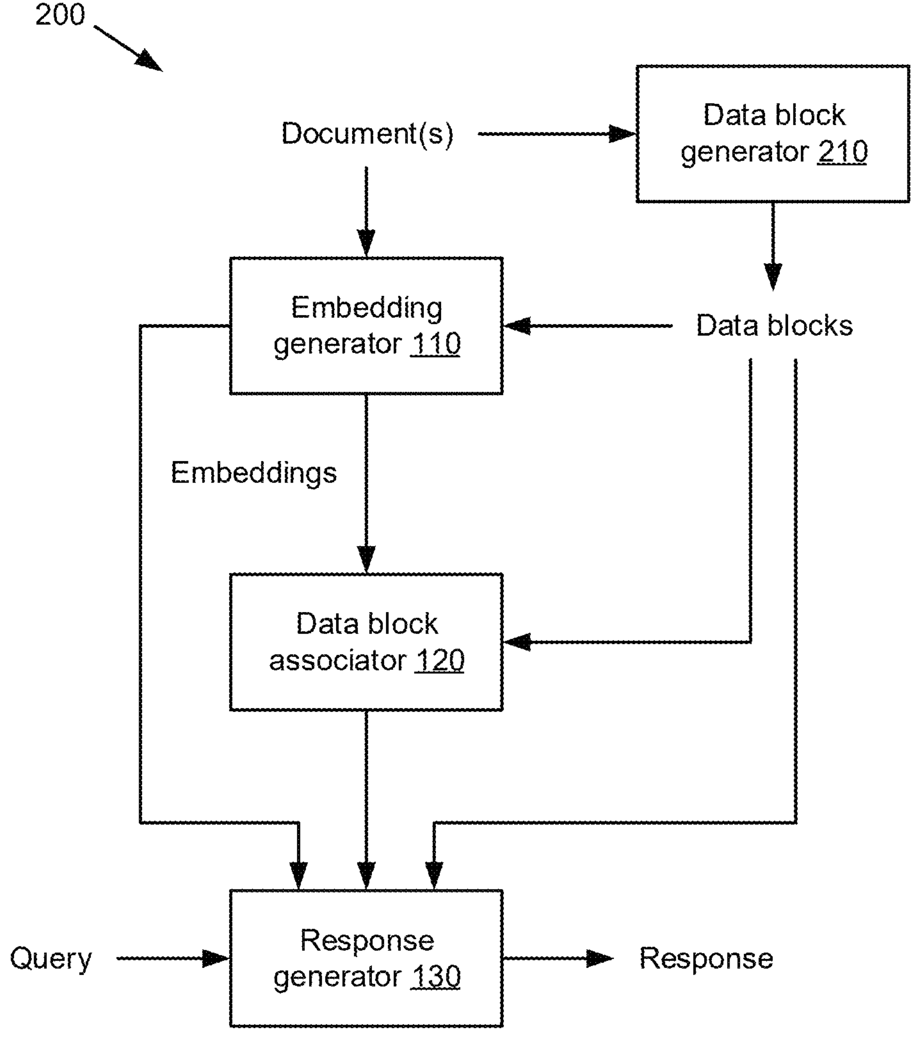
Figure 6:
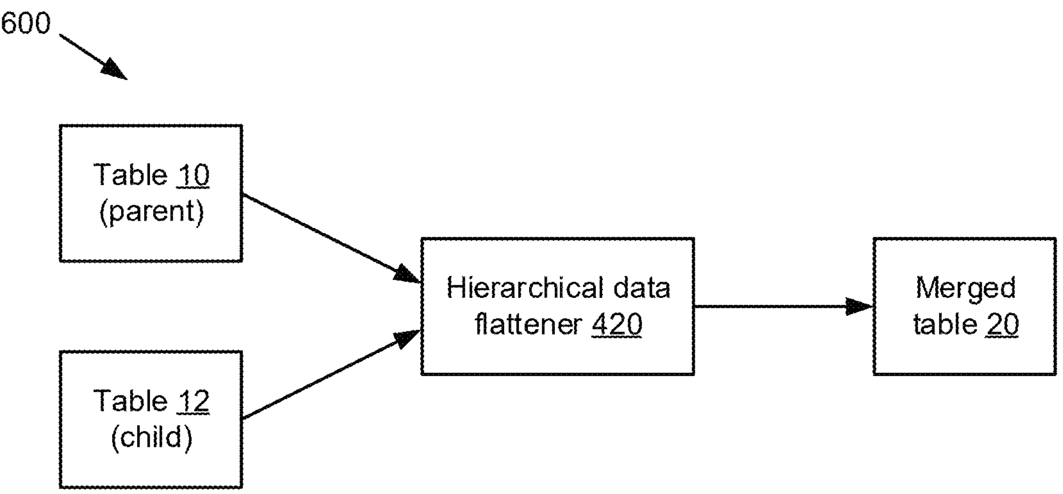
FIGS. 6-9 are block diagrams of additional systems that facilitate optimized RAG for complex documents in accordance with various implementations described herein.

Turning next to FIG. 2, a block diagram of another system 200 that facilitates optimized RAG for complex documents is shown. System 200 includes the components 110, 120, 130 of system 100 described above with respect to FIG. 1, which can operate in a similar manner to that described above within system 200. In addition, system 200 includes a data block generator 210 that can generate the data blocks processed by the components 110, 120, and/or 130 of system 100 from tabular data present in respective corresponding documents, e.g., in the form of data tables or charts. Operation of the data block generator 210 is described in further detail below with respect to FIGS. 4-6.

Figure 3:
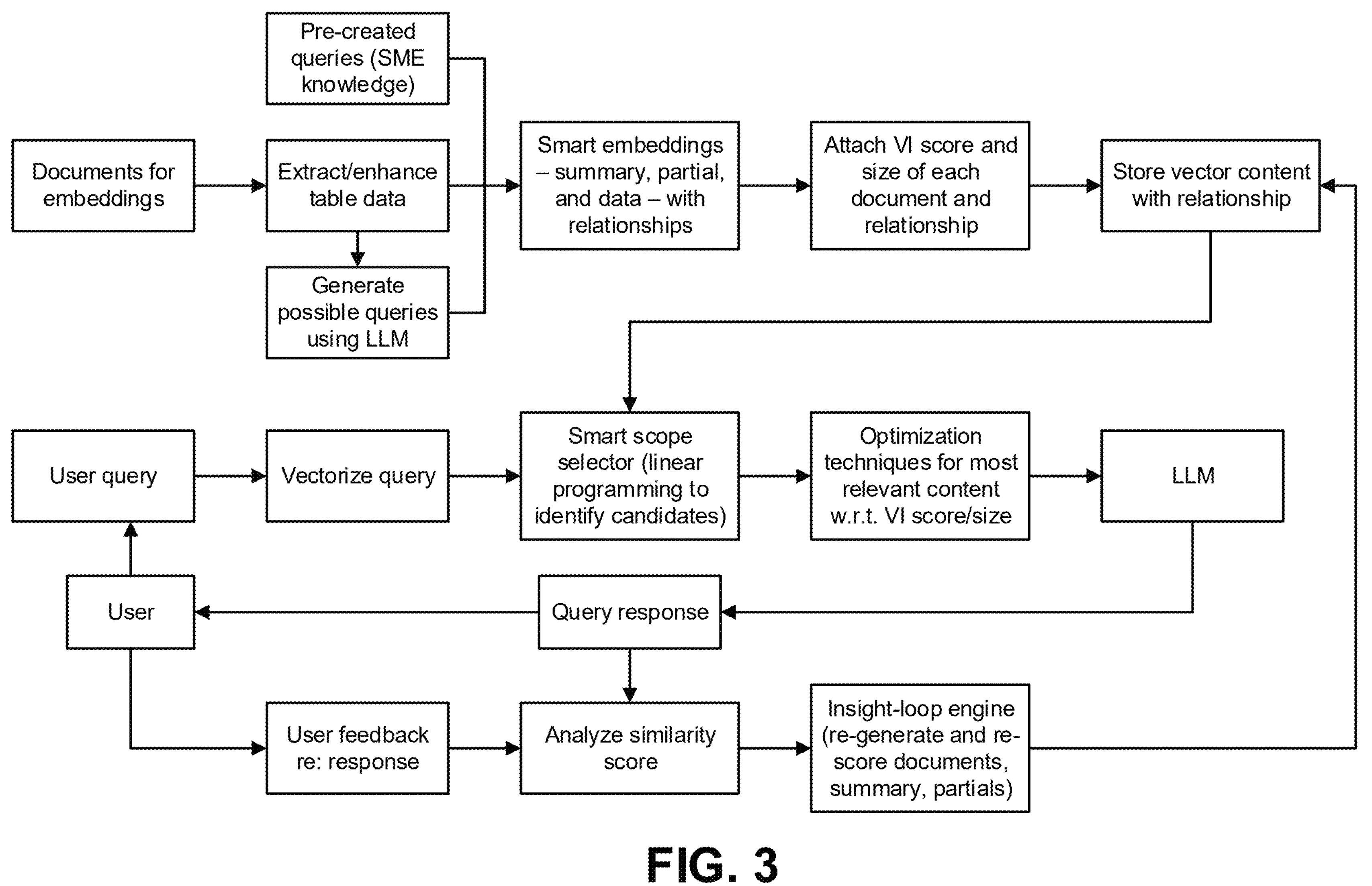
FIG. 3 is a diagram illustrating an RAG system framework in which various implementations described herein can function.

With reference now to FIG. 3, an example RAG infrastructure in which various implementations described herein can operate is illustrated. As shown by FIG. 3, implementations as described herein can convert an input document, e.g., a document for which embeddings are to be generated, in order to extract tabular data from the document and convert that data into an LLM-readable format. As further shown in FIG. 3, a smart embedding technique, e.g., based on a token-constrained value maximization (TCVM) framework, can be used to store document embeddings in various forms, such as full, summary, and partial, along with the relationships between those embeddings and blocks of tabular data (e.g., as determined by the data block associator 120 as described above). Each of these embeddings and corresponding relationships can be tagged with a value information (VI) score, and/or other suitable relevancy score, as well as their corresponding size. This structure can allow for the pre-calculation of potential relevance for anticipated queries, including pre-created queries constructed using subject matter expert (SME) knowledge as well as LLM-generated queries, using one or more metrics, as will be described in further detail below with respect to FIG. 9. By associating each document variation with its VI score and size, the framework shown in FIG. 3 can be primed to efficiently manage the token constraints inherent in LLM operations, ensuring that only the most relevant and valuable content is utilized during the generation process.

During retrieval (e.g., in response to a user query), the RAG framework shown in FIG. 3 can employ relaxed linear programming techniques to identify an optimal set of documents to retrieve for the query by balancing the VI of each document against the token budget of the underlying LLM. Additionally, a bound-and-branch search technique can be applied to further refine this selection, ensuring that the included document content maximizes the overall value information for the query. This initial linear programming step, as well as the subsequent bound-and-branch search step, are described in further detail below with respect to FIG. 12. This approach not only enhances the precision and relevance of the retrieved content but also significantly optimizes the processing time, making the framework shown in FIG. 3 a powerful took for handling complex, token-constrained retrieval scenarios in modern AI applications.

Referring again to FIG. 2, various implementations described herein can be conceptually divided into three parts. These parts include the following:

Enhanced structured data handling (e.g., as implemented via the data block generator 210): This can be used to convert the data and visual representations contained within tables in a document into a normalized data structure that an associated LLM can understand.

Smart embeddings with relationship (e.g., as implemented via the embedding generator 110 and the data block associator 120): As used herein, "smart embeddings" are a dynamic storage solution that can categorize document embeddings into full, summary, and partial forms along with their associated data, each of which can be associated with a unique VI (relevancy) score and size for different anticipated queries for the corresponding documents. This can ensure optimized storage and retrieval of content for diverse query types, allowing for efficient and targeted access to the most relevant information.

Smart scope selector (e.g., as implemented via the response generator 130): This can be used to leverage advanced linear programming and optimization techniques to dynamically select and assemble the most relevant content from the smart embeddings. By maximizing value information, this can deliver highly accurate and contextually relevant responses tailored to user queries.

Figure 4:
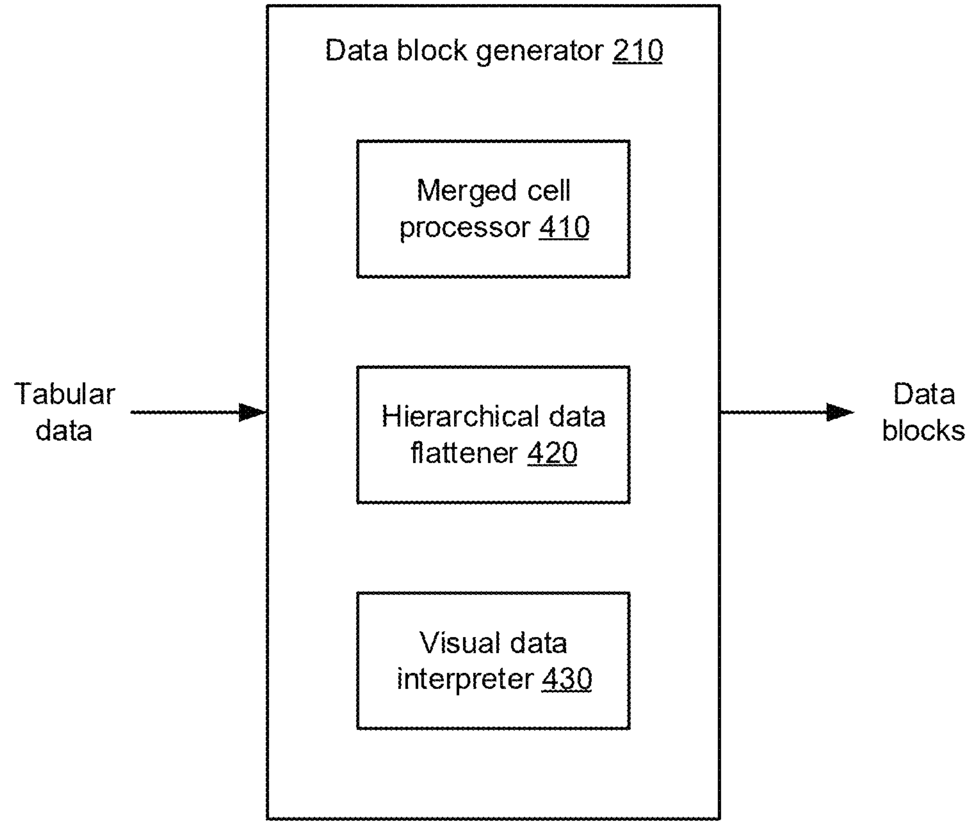
FIG. 4 is a block diagram of another system that facilitates optimized RAG for complex documents in accordance with various implementations described herein.

With reference now to FIG. 4, various functions that can be performed by the data block generator 210 of system 200 are described in further detail. In general, the data block generator 210 can be utilized to extract tabular data from documents with complex structures, such as merged cells, hierarchical relationships between tables, or the like. To this end, the data block generator 210 shown in FIG. 4 includes various subcomponents, such as a merged cell processor 410, a hierarchical data flattener 420, and a visual data interpreter 430, each of which can operate as described below to convert potentially complex tables, and/or groups of related tables, into normalized tables of a simplified format that is easier for LLMs to understand. Similar to the components 110, 120, 130 of system 100 as described above, the subcomponents 410, 420, 430 shown in FIG. 4 can be implemented via hardware, software, or a combination of hardware and software.

Various operations that can be performed by the data block generator 210 and its respective subcomponents 410, 420, 430 as shown in FIG. 4 are described below with reference to example tables 500, 502 shown in FIG. 5. In the example shown by FIG. 5, tables 500, 502 are related tables contained within different sections of the same document. Table 500 details two different medicines and is located in a "medicine" section of the document, while table 502 specifies trial details for those medicines and is located in a "trial" section of the document. Existing general-purpose embedders would process the document corresponding to tables 500, 502 by converting all of the text, including the data represented in the tables, into vectors without considering their contextual relationships. As a result, when a query is made, an associated LLM would perform semantic search or other similarity calculations between the query and the vectorized content. This approach often fails to capture the correct relationship and/or context between related tables such as tables 500 and 502, potentially leading to responses that lack accuracy and relevance.

As further shown by FIG. 5, table 502 is a complex table that includes merged columns and rows, non-intuitive column names (e.g., Pt_ID instead of Patient ID), color coding of cells (represented in FIG. 5 via different tones of black and white shading for purposes of illustration), and images present in the cells (e.g., checkmarks and cross marks). Existing general-purpose embedders do not have the capability to represent all of the data represented via table 502, potentially leading to further inaccuracy and/or degraded relevance of query responses. In contrast, the data block generator 210 shown in FIG. 4 can facilitate normalization of complex tables, such as table 502, into a format that can be readily understood by LLM embedders.

Prior to operation of the subcomponents 410, 420, 430 shown in FIG. 4, the data block generator 210 can identify tables or charts present in a given document via identification of table boundaries and structures. For instance, the data block generator 210 can utilize technologies such as portable document format (PDF) libraries, natural language processing (NLP) techniques, or the like to detect and delineate the boundaries of tables within documents. This can enable the recognition of different types of table structures, including those with merged cells and/or hierarchical relationships.

Once tables or equivalent structures in a document have been identified by the data block generator 210, the data block generator 210 can extract information such as headers, titles, and/or captions from each table to understand the content and context of respective tables. These elements can be used by the data block generator to provide information regarding the relationship between tables. For instance, the data block generator 210 can apply hierarchical clustering techniques to group tables in a document based on similar content or context, establishing potential parent-child relationships.

Also or alternatively, the data block generator 210 can use NLP techniques to analyze and understand the semantics of these headers and titles, identifying keywords that could indicate a relationship, such as, e.g., "summary," "detail," "comparison," or the like. Similarly, the data block generator 210 can detect cross-references within tables that link to other tables. This can include footnotes, references in captions, or text within the document that explicitly connects one table to another (e.g., "See Table 2 for details"). In some implementations, the data block generator 210 can use regular expressions and/or pattern matching to detect these cross-references, creating a mapping of table relationships.

As an additional alternative, the data block generator 210 can analyze the physical layout of a document to determine the proximity of tables to each other, e.g., because tables that are close to each other in the document can be determined by the data block generator 210 to be more likely to be related. To this end, the data block generator 210 can use document layout analysis algorithms to assess whether tables are positioned in a manner suggesting a relationship. For instance, a summary table followed by a detailed breakdown table could be determined by the data block generator 210 to be related. As still another example, the data block generator 210 can identify hierarchical relationships between tables by analyzing the structure and content of respective tables. For instance, a parent table can summarize data at a higher level (e.g., by country), while a child table can provide detailed breakdowns of that data (e.g., patient data for a given country).

In general, the data block generator 210 can utilize one or more of the above techniques, and/or other suitable techniques, to define relationships between tables and/or charts associated with a document or group of documents. In some implementations, relationships determined by the data block generator 210 in accordance with the above can be provided to a human user for verification and/or revision, e.g., via the use of directed prompts. By way of example, a user can be presented a listing of the tables identified in a document and inferred relationships between those tables along with prompts to verify and/or correct the identified information.

Once relationship(s) between tables and/or charts have been established (and optionally verified) as described above, the data associated with the table can be normalized, e.g., via the subcomponents 410, 420, 430, as will be described below. "Normalization" of a table or chart, as used herein, refers to the process of converting a table or chart into a simplified (normalized) table, e.g., in a comma-separated value (CSV) format or the like, that can be readily interpreted by an LLM.

With reference now to the subcomponents 410, 420, 430 shown in FIG. 4, the merged cell processor 410 can detect merged cells and expand them into individual cells, repeating the content in the cells as needed to ensure a uniform table structure. Stated another way, the merged cell processor 410 can split a merged cell in a data table into a group of unmerged cells and then duplicate contents of the merged cell into respective ones of the group of unmerged cells.

The hierarchical data flattener 420 can convert hierarchical data into a flat relational format by associating child entries with corresponding parent identifiers. An illustrative example of the operation of the hierarchical data flattener 420 is shown via system 600 in FIG. 6. As system 600 illustrates, the hierarchical data flattener 420 can identify a relationship (e.g., a parent-child relationship) between a first table 10 and a second table 20, e.g., based on context information associated with a document in which the tables appear. The hierarchical data flattener 420 can then merge the tables 10, 20 based on the identified relationship, resulting in a merged table 20. The merged table 20 can then be utilized by the data block generator 210 to generate a data block from the merged table 20.

In an implementation, a merged table 20 can be constructed by the hierarchical data flattener 420 by merging a child table 12 into a parent table 10 in a way that duplicates the parent table data, e.g., in a similar manner to the merged cell processor 410. For instance, if the parent table 10 contains employee names (Employee 1, Employee 2, etc.) and the child table 12 contains details on an employee (e.g., Detail A, Detail B, etc.), the merged table 20 can contain cells that preserve this relationship, e.g., "Employee 1—Detail A," "Employee 1

Detail B," etc. Additionally, while not shown in FIG. 6, the hierarchical data flattener 420 can merge any suitable number of tables into a single merged table 20, e.g., in response to determining that a parent table 10 has multiple child tables 12.

Returning to FIG. 4, the visual data interpreter 430 can be utilized to replace non-text information in a table, such as cell color coding, emojis or other symbols, or the like, with a text representation of the non-text information based on context information associated with the document in which the table appears. By way of example, color-coded indicators can be transformed by the visual data interpreter 430 into explicit textual descriptions or metadata annotations, e.g., that describe the significance of the color coding to enable an LLM to interpret this significance when it would otherwise be lost in the color coding.

In an implementation, the visual data interpreter 430 can detect color coded information in a table at the time the table is loaded by the data block generator 210. The visual data interpreter can then attempt to infer the significance of the color coding, e.g., based on a table legend and/or other context information associated with the table as present in the document. Also or alternatively, text annotations associated with color codes present in a table can be manually provided and/or verified by a user associated with the data block generator 210. As another alternative, if a table is generated in a format that enables conditional formatting, the visual data interpreter 430 can analyze the associated conditional formatting rules to determine the significance of respective color codes. As still another alternative, if a table contains color coded cells that also contain information, the visual data interpreter 430 can in some cases infer the significance of the cell color coding based on the content of the associated cells, e.g., if the color coding denotes numerical ranges or similar criteria.

As shown in FIG. 4, the data block generator 210 and its respective subcomponents 410, 420, 430 can represent stages of a normalization process that can be utilized to convert tabular data present in a document into a normalized format that can be accurately interpreted by an LLM embedder. This normalization process can be defined as a transformation function N, e.g., as follows:

$$N: T \rightarrow F(T),$$

where T denotes a table extracted from a document and F (T) denotes the flattened, normalized table structure, which includes explicit metadata for hierarchical relationships, color-coded indicators, and the like. This transformation can include the following steps, which correspond to the respective subcomponents 410, 420, 430 shown in FIG. 4.

Merged cell expansion (e.g., via the merged cell processor 410): For any merged cell $M_k \in M$, where M⊆TM represents the set of merged cells within the table and Mk spans multiple rows or columns, expand the merged cell as follows:

$$\text{Expand } M_k \rightarrow \{C_{i,j} \mid \forall (i,j) \in \text{span}(M_k)\},$$

where $C_{i,j}$ represents the cells of table T. After expanding a merged cell as shown above, the content of the merged cell can be repeated across all spanned cells.

Hierarchical flattening (e.g., via the hierarchical data flattener 420): For each hierarchical level $H_l \in H$ (T), where H (T) represents the hierarchical structure of table T, map the hierarchical level to a flat structure by associating each child with its parent identifier.

Color coding annotation (e.g., via the visual data interpreter 430): For each cell $C_{i,j}$ with a color indicator, e.g., Color $(C_{i,j})$={none, yellow, red, . . . }, add annotations $A_{i,j}$ based on the color indicators as follows:

if Color $(C_{i,j}) \neq$ none=>Add annotation $A_{i,j}$ $A_{i,j}$=Interpret Color $(C_{i,j})$ as textual description Once the table structure and visuals are normalized and annotated as described above, the tables can be removed from the document and replaced with their normalized versions, e.g., as described above, along with relationship identifiers that can inform the LLM regarding which data from a hierarchical flattened representation is from which table in the original document.

Figure 7:
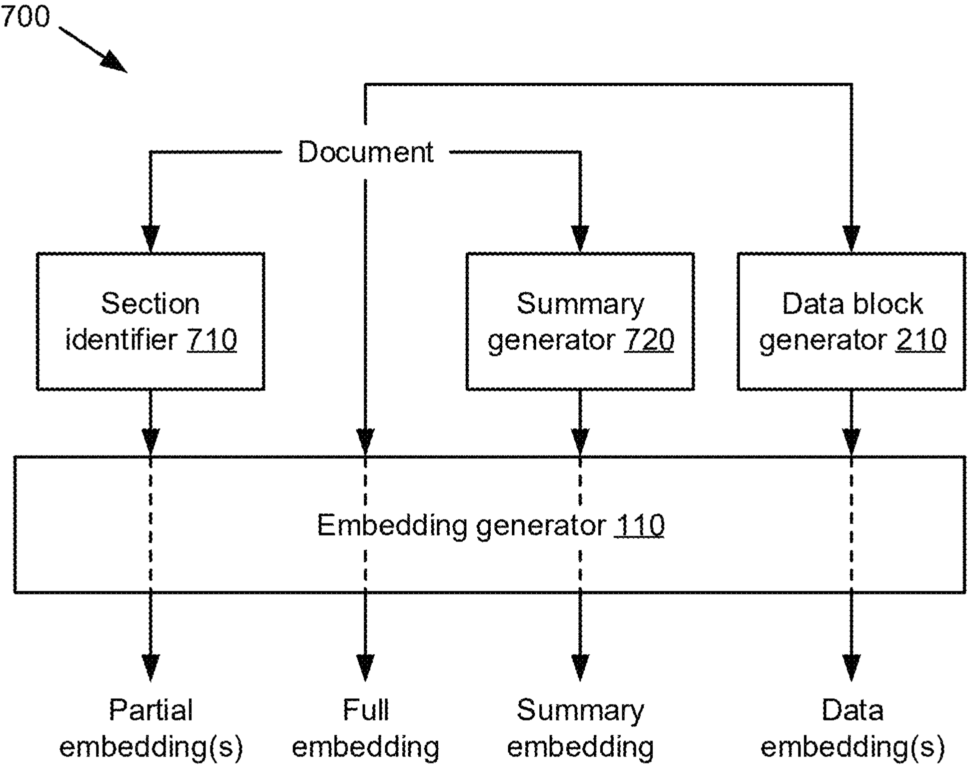

Turning next to FIG. 7, a block diagram of another system 700 that facilitates optimized RAG for complex documents is illustrated. Repetitive description of like parts described above with regard to other implementations is omitted for brevity. System 700 as shown in FIG. 7 includes an embedding generator 110 that can generate multiple embeddings for a given document. As shown in FIG. 7, these embeddings can include a partial embedding representative of a section of the document, a full embedding representative of an entirety of the document, a summary embedding representative of a generative summary of the document, and a data embedding representative of respective data blocks generated from the document (e.g., by the data block generator 210 as described above).

The different embedding levels shown by FIG. 7 can be generated to facilitate more granular information retrieval from a given set of documents, e.g., because entire documents are often too large for an LLM. By breaking down a document into multiple embedding levels as shown in FIG. 7, more relevant information can be retrieved in response to a query while still keeping a total amount of retrieved information below a token size limit associated with the LLM. Embedding retrieval based on token size constraints is described in further detail below with respect to FIGS. 11-12.

The section identifier 710 in system 700 can identify respective sections of a document $d_i$ for partial inclusion. This can be done using techniques like text segmentation, importance ranking, or the like. From these sections, the section identifier 710 can then select the most relevant portion(s)

$$d_i''$$

based on specific criteria (e.g., the first few paragraphs of the document, the most relevant section, etc.). If multiple sections are identified in a single document, they can be denoted as $$d_{ij}''$$

where j represents a section index. The data blocks associated with the identified partial document(s) can then be identified and extracted, e.g., according to $$d_{ij}'' = PartialExtract(d_i).$$

Next, the embedding generator can create an embedding for the partial document, e.g., according to $$E_i'' = \text{Embed}(d_i'').$$

As further shown in FIG. 7, the embedding generator 110 can create an embedding $E_i$ for the full document $d_i$, e.g., according to $E_i$=Embed($d_i$), by removing the original table data in the document. This can be done using one or more pre-trained ML models, custom embeddings fine-tuned for the domain, and/or by other means.

The summary generator 720 can create a generative summary of the document, e.g., using techniques such as extractive summarization (e.g., TextRank), abstractive summarization (e.g., BART, T5, etc.), or the like, represented as $$d_i' = \text{Summarize}(d_i).$$

Next, the embedding generator 110 can create an embedding for the summary, e.g., according to $$E_i' = \text{Embed}(d_i').$$

As further shown in FIG. 7, each data block generated by the data block generator 210 for a document can then be embedded separately, e.g., according to $TE_i$=Embed ($T_i$), where $T_i$ is the set of data blocks for the document. The relevant embedded data blocks can then be attached to the other embedding levels. For instance, the embedded data blocks corresponding to a partial document can be attached to a corresponding partial embedding, and the embedded data blocks for the full document can be attached to the full and/or summary embeddings, e.g., assuming token window size constraints are met.

Figure 8:
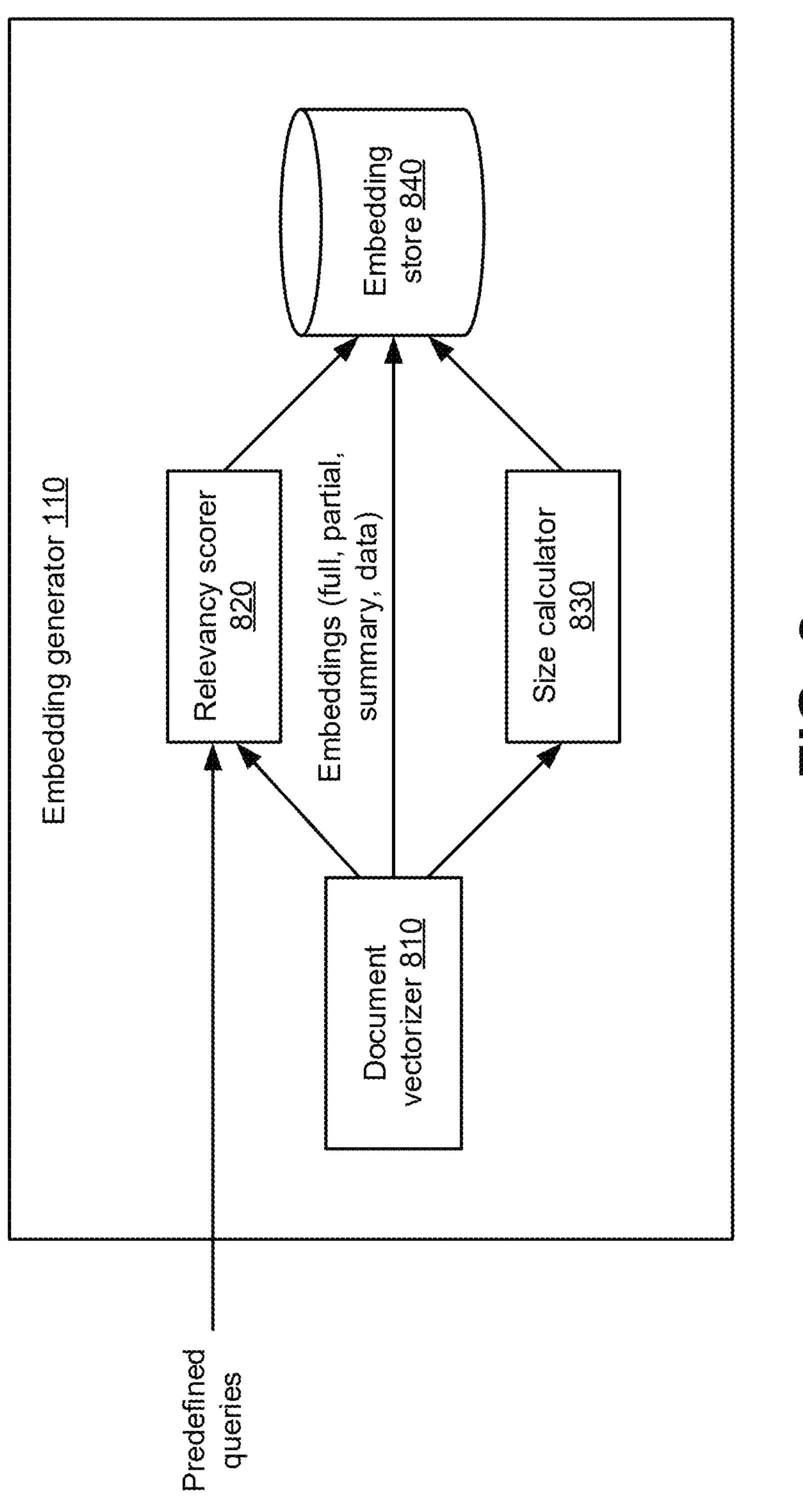

With reference now to FIG. 8, further operations that can be performed by the embedding generator 110 for the embedding levels described above with respect to FIG. 7 are illustrated. The embedding generator 110 as shown in FIG. 8 includes a document vectorizer 810, which can generate the embeddings (e.g., full, summary, partial, data) described above with respect to FIG. 7 for a given document.

The embedding generator 110 shown in FIG. 8 further includes a relevancy scorer 820, which can assign, based on a given input query intent, relevancy scores (e.g., VI scores, etc.) for that query to respective embeddings as generated by the document vectorizer 810.

Figure 9:
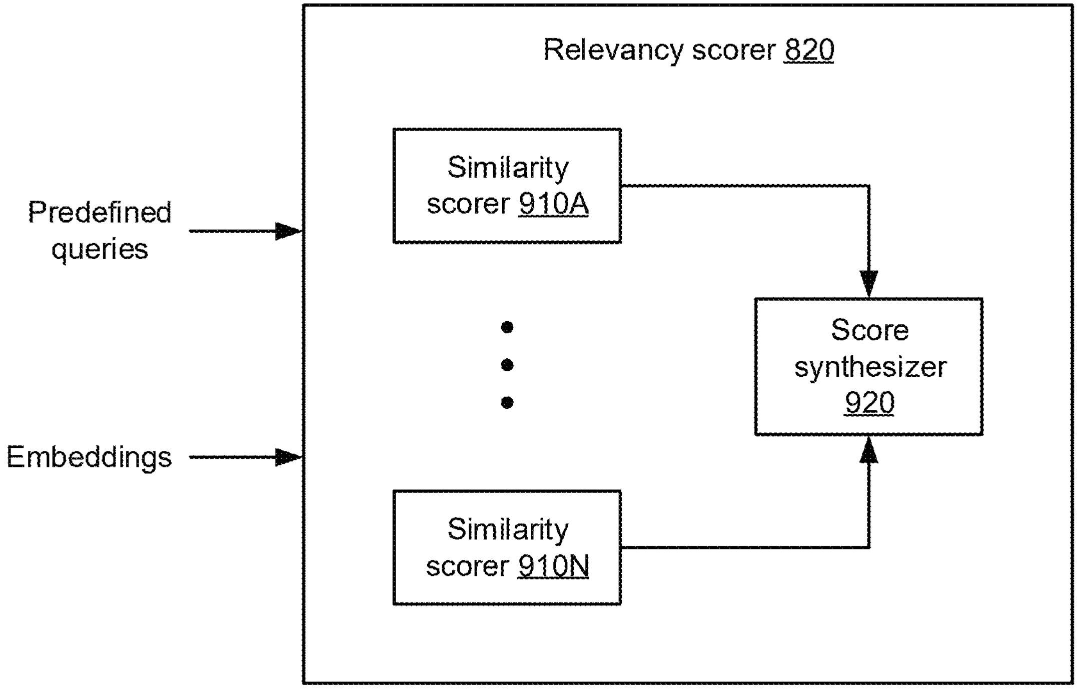

An example implementation of the relevancy scorer 820 is shown by FIG. 9. As FIG. 9 illustrates, the relevancy scorer 820 can determine a group of similarity metrics (e.g., via similarity scorers 910), which can be representative of an extent (amount, degree) of similarity between a query intent (e.g., as extracted from a query via an intent classification model and/or by other means) and a given embedding. The relevancy scorer 820 can then, via a score synthesizer 920, synthesize the similarity metrics to assign a VI score to a given embedding-intent combination, e.g., as a function of a weighted sum of the group of similarity metrics, and/or by other means.

While N similarity scorers 910A-910N are shown in FIG. 9, it is noted that the numbering convention utilized for the similarity scorers 910 is not intended to imply any specific number of similarity scorers 910, as the relevancy scorer 820 could use any suitable number of similarity scorers 910, including one similarity scorer 910 or multiple similarity scorers 910. In addition, while the following description relates to specific similarity metrics that can be utilized by the relevancy scorer 820, it is noted that these similarity metrics are provided merely by way of example and are not intended to be limiting on the similarity metrics that could be utilized by the relevancy scorer 820.

The relevancy scorer 820 can pre-calculate VI scores for each embedding for each of a group of predefined queries, e.g., which can be representative of expected query types for a given document or set of documents. The predefined queries can be compiled by a subject matter expert (SME), an ML model, and/or other suitable means. In the event that a query is received that does not match any of the predefined query intents, a VI score for that query can be computed by the embedding generator 110 in real time.

In a non-limiting example implementation of the relevancy scorer 820, a VI score can be determined via a weighted sum of two primary metrics, namely a ROUGE (recall-oriented understudy for gisting evaluation) score and a cosine similarity score. More particularly, for each variation (e.g., full, summary, partial, data) of a document $d_i$, the relevancy scorer can calculate ROUGE scores for each variation, e.g., based on the similarity between the associated embeddings and a reference query intent, according to $\text{ROUGE}_i$=ROUGE ($d_i$, reference) for the full document, $$\text{ROUGE}'_i = \text{ROUGE}(d'_i, \text{reference})$$

for the summary, and $$\text{ROUGE}''_{ij} = \text{ROUGE}\left(d''_{ij}, \text{reference}\right)$$

for each partial embedding.

Similarly, the relevancy scorer 820 can compute a semantic score for respective embedding variations of a document using, e.g., cosine similarity between the embeddings for a document and a reference query or other relevant texts, according to $\text{Semantic}_i$=CosineSimilarity ($E_i$, query_embed) for the full document, $$\text{Semantic}'_i = \mathit{CosineSimilarity}(E'_i, \text{query\_embed})$$

for the summary, and $$\text{Semantic}''_{ij} = \mathit{CosineSimilarity}\left(E''_{ij}, \text{query\_embed}\right)$$

for each partial embedding.

Based on the above, the VI score for an embedding-intent combination can be computed as a weighted sum of the ROUGE and semantic scores, e.g., according to $VI_i=\alpha\cdot\text{ROUGE}_i+\beta\cdot\text{Semantic}_i$ for the full document, $$VI'_i = \alpha\cdot\text{ROUGE}'_i + \beta.$$

$\text{Semantic}'_i$ for the summary, and $$VI''_{ij} = \alpha\cdot\text{ROUGE}''_{ij} + \beta\cdot\text{Semantic}''_{ij}$$

for each partial embedding. In the above expressions, α and β are weight parameters that can be set based on the LLM to be utilized and/or other factors.

To generalize the above for different scoring schemes, the total VI for a given document can be expressed as the aggregation of all VI scores computed for that document, e.g., as follows for an aggregation of m VI scores:

$$VI_i = \sum_{k=1}^{m} w_k \cdot VI_i(q_k),$$

where $w_k$ is the per-score weighting factor.

Referring now to the size calculator 830 of the embedding generator 110 shown in FIG. 8, the size calculator can measure the size of each document variation (e.g., full, summary, partial, data) based on token counts, e.g., according to $s_i$=TokenCount ($d_i$) for the full document, $$s'_i = \mathit{TokenCount}(d'_i)$$

for the summary $$s''_{ij} = \mathit{TokenCount}\left(d''_{ij}\right)$$

each partial embedding, and $$s''_{id} = \mathit{TokenCount}\left(d''_{dj}\right)$$

for each data block.

Figure 10:
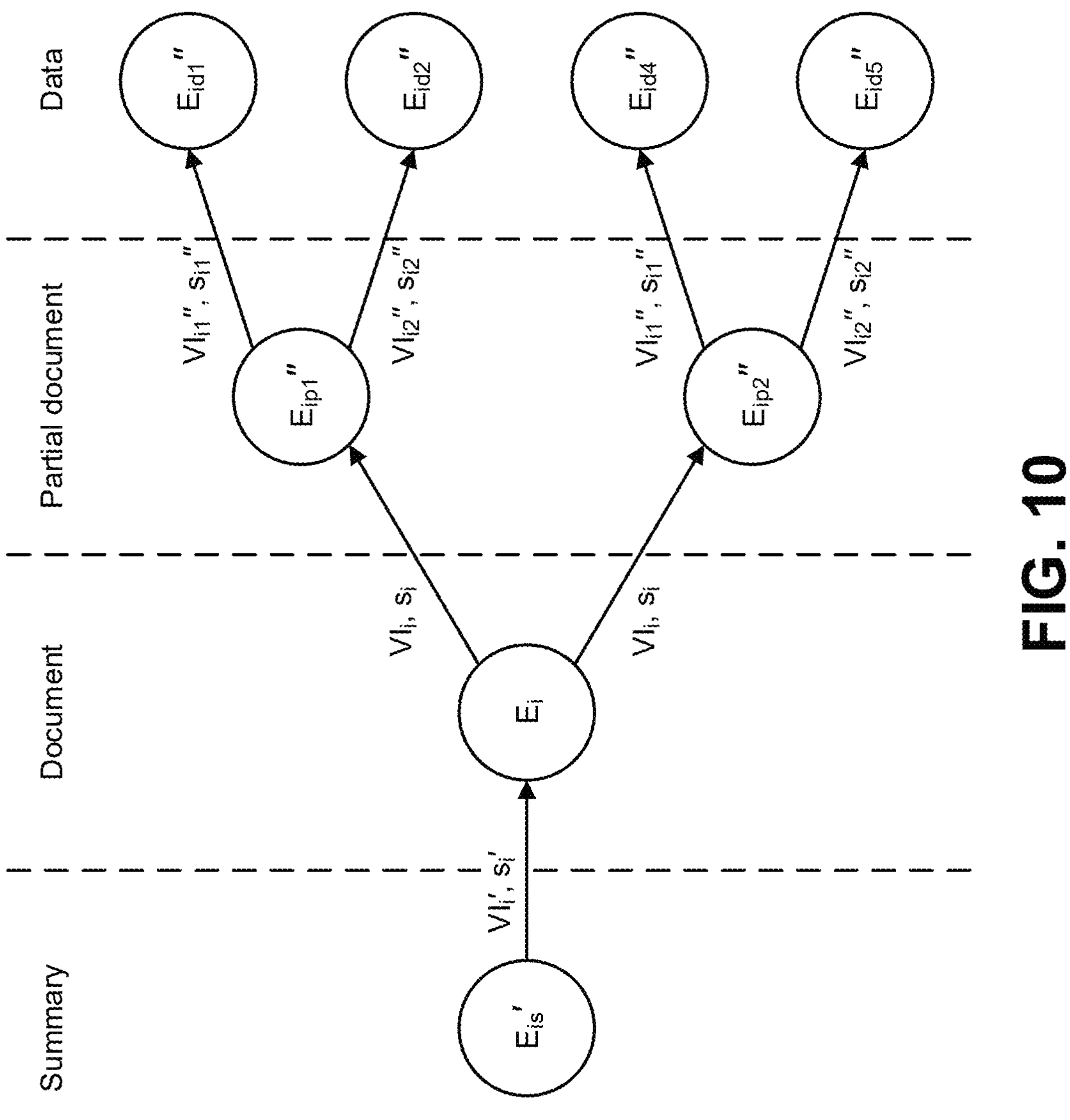
FIG. 10 is a diagram illustrating example data relationships that can be leveraged via various implementations described herein.

Once the embeddings, VI scores, and size data have been generated by the embedding generator 110 as described above, the embedding generator 110 can store the embeddings as well as the VI scores, size data, and any other suitable metadata in an embedding store 840. In an implementation, the embedding generator 110 can also establish and store relationships between the data stored in the embedding store 840. An example of this is illustrated by FIG. 10. FIG. 10 shows that, for a given document, the embedding store 840 can include embeddings, VI score data, and size data for the full document (e.g., $E_i$, $VI_i$, $s_i$), a summary of the document $$(\text{e.g., } E'_{is}, VI'_i, s'_i),$$

partial documents associated with the document $$\left(\text{e.g., } E''_{ipj}, VI''_{ij}, s''_{ij}\right),$$

and data blocks associated with the document $$\left(\text{e.g., } E''_{idj}, VI''_{ij}, s''_{ij}\right).$$

As further shown by FIG. 10, the embedding store 840 can also store relationships between the document and summary (one-to-one), the document and its partial documents (one-to-many), partial documents to their corresponding data blocks (one-to-many), and the document to its corresponding data blocks (one-to-all, not shown in FIG. 10).

Figure 11:
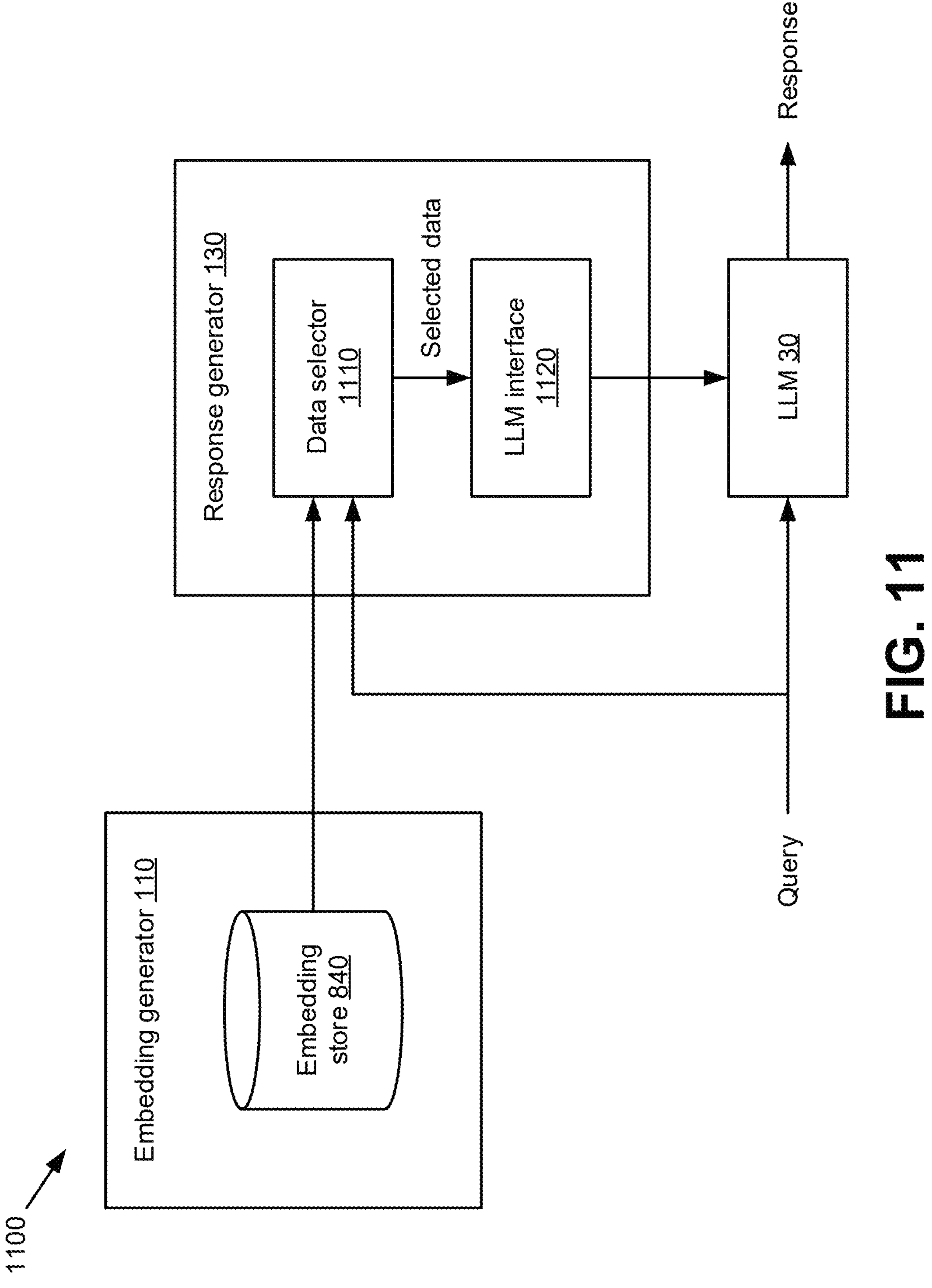
FIGS. 11-12 are block diagrams of further systems that facilitate optimized RAG for complex documents in accordance with various implementations described herein.

Turning to FIG. 11, a block diagram of another system 1100 that facilitates optimized RAG for complex documents is illustrated. Repetitive description of like parts described above with regard to other implementations is omitted for brevity. System 1100 as shown in FIG. 11 includes a response generator 130 that can facilitate generation of a response to an input query to an LLM 30, e.g., as described above with respect to FIG. 1. To this end, the response generator 130 includes a data selector 1110 that can select and/or retrieve data corresponding to an associated set of documents, e.g., based on information provided by an embedding store 840 as maintained by an embedding generator 110 as described above. Upon selecting and/or retrieving suitable data for a given input query, an LLM interface 1120 can direct and/or otherwise facilitate generation of a response to the input query by the LLM 30 based on the selected and/or retrieved information.

Figure 12:
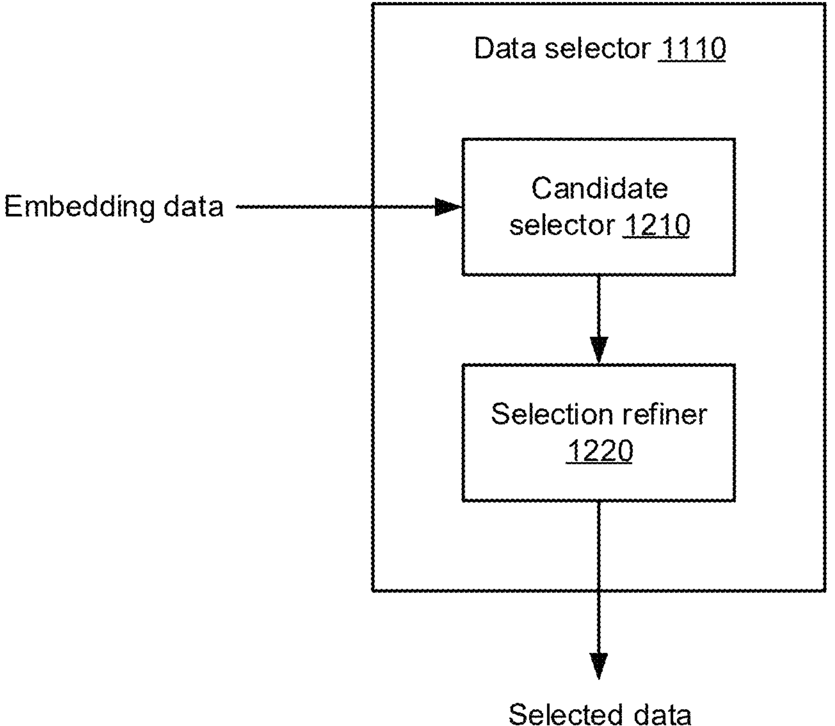

Operations that can be performed by the data selector 1110 are illustrated in further detail in FIG. 12. Here, the data selector 1110 includes a candidate selector 1210 that can determine a group of candidate embeddings for a query output based on a linear programming process applied to information provided by the embedding store 840 as shown in FIG. 11, e.g., respective embeddings and their associated metadata (VI score, size, etc.). The data selector 1110 shown in FIG. 12 additionally includes a selection refiner 1220 that can select, from the group of candidate embeddings identified by the candidate selector 1210, output data for generation of the query output, resulting in selected output data. As will be described in further detail below, the selection refiner 1220 can select a subset of the candidate embeddings, e.g., including less than all of the candidate embeddings, according to a branch-and-bound process guided by a bounding function.

A linear programming relaxation technique that can be utilized by the candidate selector 1210 in an implementation can proceed as follows. Initially, binary variables $$x_i^F, x_i^S, x_i^P$$

can be defined that represent whether the full, summary, or partial content of document $D_i$, respectively, is selected. Using these variables, a linear programming problem can be defined as follows for a group of k documents:

Objective function: Maximize $$\sum_{i=1}^{k}\left(VI_i^F \cdot x_i^F + VI_i^S \cdot x_i^S + VI_i^P \cdot x_i^P\right)$$

Subject to:

$$\sum_{i=1}^{k}\left(\text{Size}_i^F \cdot x_i^F + \text{Size}_i^S \cdot x_i^S + \text{Size}_i^P \cdot x_i^P\right) \leq 32K$$

Constraints:

$$x_i^F + x_i^S + x_i^P \leq 1$$

for each i

The candidate selector 1210 can then solve this linear programming problem by relaxing the binary constraints, allowing $$x_i^F, x_i^S, x_i^P$$

to take fractional values between 0 and 1. In doing so, the candidate selector 1210 can provide a preliminary selection of documents, indicating which documents should be included as full, summary, or partial content.

The relaxed linear programming problem defined above can result in fractional values, indicating the relative importance of each document variation and data relation. From these results, the candidate selector 1210 can select documents where the fractional value is close to 1, e.g., within some defined tolerance, as a likely candidate for the full content. Other documents with lower fractional values, e.g., 0.5-0.7, can be selected as partial and/or summary candidates.

From the candidates selected by the candidate selector 1210 according to the above, the selection refiner 1220 can perform selective refinement using a bound and branch technique to explore combinations of the fractional selections made by the candidate selector 1210 to find an optimal solution that maximizes VI while respective the token constraints. This process can be summarized as follows:

Branch: Create branches by rounding the fractional selections.

Bound: Calculate the upper bound of VI for each branch and prune branches that exceed the token constraint or offer lower VI.

Selection: Continue the branch and bound steps until a combination of documents that provides the maximum VI under the token budget is identified.

As a non-limiting example of operations that can be performed by the data selector 1110, consider a set of six documents, D1-D6, corresponding to a financial report for an organization. The documents each contain large amounts of complex table data, e.g., with color coding, merged cells, etc. If embedded using existing RAG embedders, the documents will be stored in a sequential way, and the table data will be extracted using some delimiter that will not properly capture the complexity of the table data. An example query submitted to an LLM under this scenario could be, e.g., "Please generate a report containing a comparison of the third and fourth quarters," from which an intent "Generate_Finance_Comparison_By_Q3_Q4_Quarter" can be derived.

For the above query, a conventional RAG system may select documents D1-D3 to meet the token window, but these documents may not contain the relevant quarterly results. Additionally, there may be table data present in the other two documents, and even if data is present in the retrieved documents, that data may not be readable by the LLM. These and/or other issues can result in sub-optimal output.

In contrast, using implementations described herein, a data block generator 210, e.g., as described above with respect to FIG. 2, can first extract all table data in a normalized format, from which the embedding generator 110 can create multiple embedding variations for each document as well as the relationships between the different embedding variations and their corresponding data, e.g., as described above with respect to FIG. 8. Based on this data, VI scores for the query intent (e.g., "Generate_Finance_Comparison_By_Q3_Q4_Quarter") can be calculated, and the size of each document can be calculated and attached to the corresponding document as metadata.

Sample VI and size data that can be tagged to documents D1-D6 in this example is provided in Table 1 below.

TABLE 1

Full/summary VI and size data for documents D1-D6.

| Document | Full VI (VI-F) | Full size (S-F) | Summary VI (VI-S) | Summary size (S-S) |
|---|---|---|---|---|
| D1 | 50 | 10K | 30 | 3K |
| D2 | 90 | 8K | 55 | 2K |
| D3 | 80 | 7K | 50 | 2.5K |
| D4 | 70 | 6K | 45 | 2K |
| D5 | 60 | 5K | 36 | 1.5K |
| D6 | 100 | 4K | 35 | 1.2K |

Similarly, partial documents can be created and mapped to their associated normalized table data, as shown in Table 2 below.

TABLE 2

Partial document VI and size data for documents D1-D6.

| Partial document | Parent document | Data blocks | Partial VI (VI-P) | Partial size (S-P) |
|---|---|---|---|---|
| D1P | D1 | T1, T2 | 20 | 6K |
| D2P | D1 | T2 | 5 | 3K |
| D3P | D1 | T4, T5 | 3.5 | 1K |
| D4P | D5 | T1, T2 | 3 | 2K |
| D5P | D6 | T2 | 2.5 | 2.5K |
| D6P | D6 | T4, T5 | 2 | 1.5K |

In this example, the LLM utilized has a 32K token window limit. While retrieving the content for the query, relaxed linear programming will run first to obtain a probable combination of documents for the query intent with a configurable error margin (e.g., 10-15%). This will yield a subset of documents that maximize the VI for the query with a relaxation of constraints equal to the error margin. This subset can then be utilized as a shortlist of documents from which a branch and bound process can be used to obtain an optimal combination.

After running the linear programming process described above, the candidate selector 1210 can shortlist a set of embeddings including $$D_2^F, D_3^F, D_4^F, \text{ and } D_6^F$$

(full documents);

$$D_1^P$$

(partial document);

$$D_5^S$$

(summary document, and T1 and T2 (data blocks mapped to the partial documents), which maximize the VI with the allowed error margin for the given query. In practice, the set of embeddings can be larger than that given in this example, and linear programming can filter out layers for specific queries efficiently.

Based on the above, the selection refiner 1220 can perform a branch and bound process such as the following:

Branch 1:

$$D_2^F, D_3^F, D_4^F, \text{ and } D_6^F$$

(full documents);

$$D_1^P$$

(partial document);

$$D_5^S$$

(summary document; and T1 and T2 (data blocks mapped to the partial documents)

Calculated VI: 90+80+70+100+20+36+120 (the VI for data blocks T1 and T2)=510

Calculated size: 8K+7K+6K+4K+6K+1.5K+0.5K (the size for data blocks T1 and T2)=33K, exceeding the limit of 32K Based on the above, bounding can be used to evaluate and discard branches that exceed the size constraint or yield a lower VI.

Pruned branches: Discard combinations exceeding 32K tokens.

Retained branch:

$$D_3^F, D_4^F, D_1^P, D_5^S,$$

The branch and bound process can form many branches with various combinations, which can be marked as "discard" or "retain" in tree format. The final optimization search can pick a most optimal branch with the bound restrictions (e.g., maximize VI with a limit of 32K tokens).

In the above scenario, the final retained branch $$D_3^F, D_4^F, D_6^F, D_1^P, D_5^S,$$

T1, and T2) yields a total VI of 470 with a total size of 23.5K tokens. In contrast, existing RAG systems would select documents D1-D4 in response to the query, which results in a total VI of 50+90+80+70=290 (i.e., less optimal), with a token window of 31K tokens (i.e., larger). Additionally, such a system would not be able to add additional documents or data without exceeding the token budget.

In general, various implementations described herein can facilitate techniques to allow uploading of a data-intensive document with tables and data relationships, as well as to optimize document content and data retrieval for a given query to give optimal VI to an associated LLM. Implementations described herein can additionally create full, summary, partial, and data embeddings for each document, enabling a more flexible and tailored retrieval that optimizes relevance while adhering to token constraints. Implementations described herein can further utilize linear programming relaxation with an allowed error margin to shortlist documents, ensuring a balance between optimal information value and computational efficiency. A branch and bound process can be used to refine this selection, focusing on maximizing VI while staying within token limits, thereby ensuring that the most relevant content is included in the final output.

Figure 13:
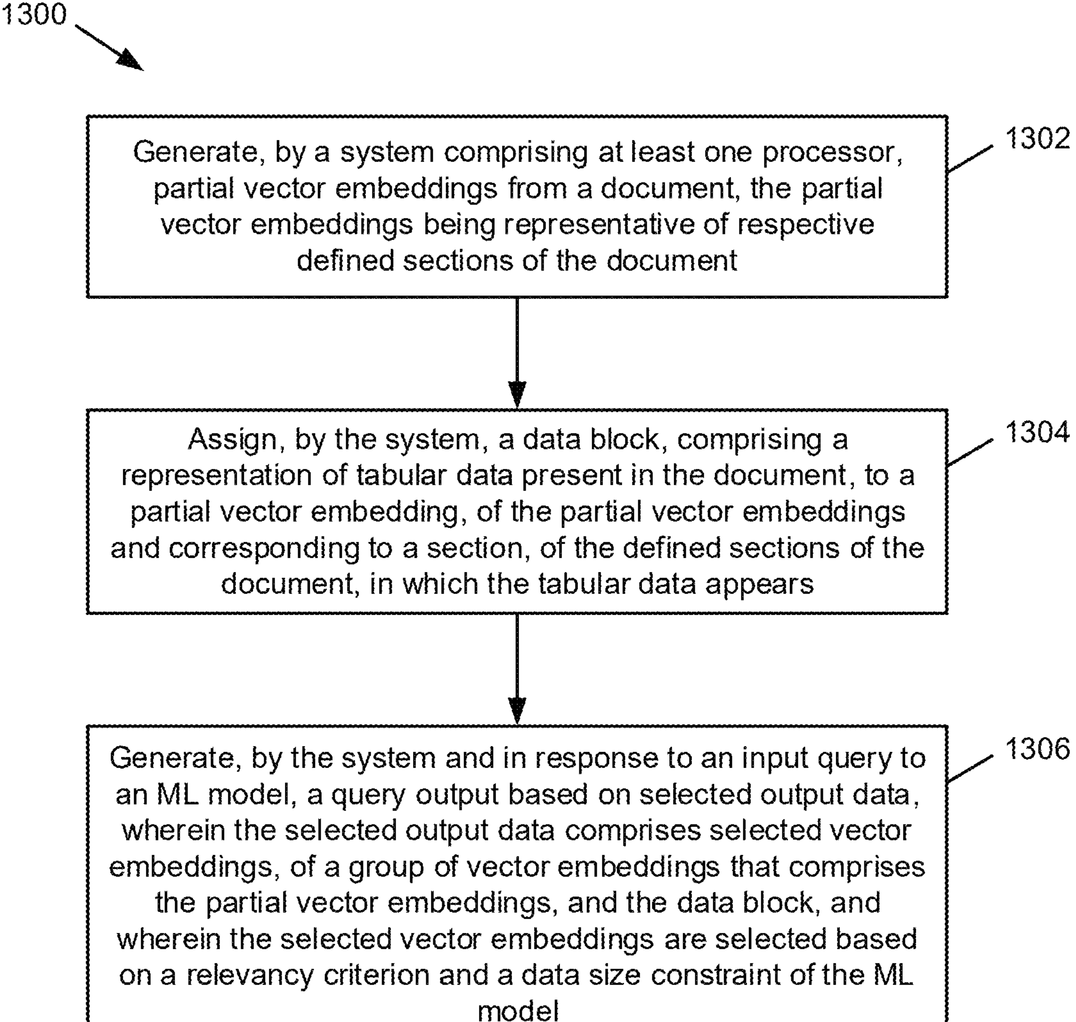
FIGS. 13-14 are flow diagrams of respective methods that facilitate optimized RAG for complex documents in accordance with various implementations described herein.

Referring now to FIG. 13, a flow diagram of a method 1300 that facilitates optimized RAG for complex documents is illustrated. At 1302, a system comprising at least one processor can generate (e.g., by an embedding generator 110) partial vector embeddings from a document, the partial vector embeddings being representative of respective defined sections of the document.

At 1304, the system can assign (e.g., by a data block associator 120) a data block, comprising a representation of tabular data present in the document, to a partial vector embedding, of the partial vector embeddings generated at 1302 and corresponding to a section, of the defined sections of the document, in which the tabular data appears.

At 1306, the system can generate (e.g., by a response generator 130), in response to an input query to an ML model, a query output based on selected output data. The selected output data can include selected vector embeddings, of a group of vector embeddings that comprises the partial vector embeddings generated at 1302, and the data block. The selected vector embeddings can be selected based on a relevancy criterion and a data size constraint of the ML model.

Figure 14:
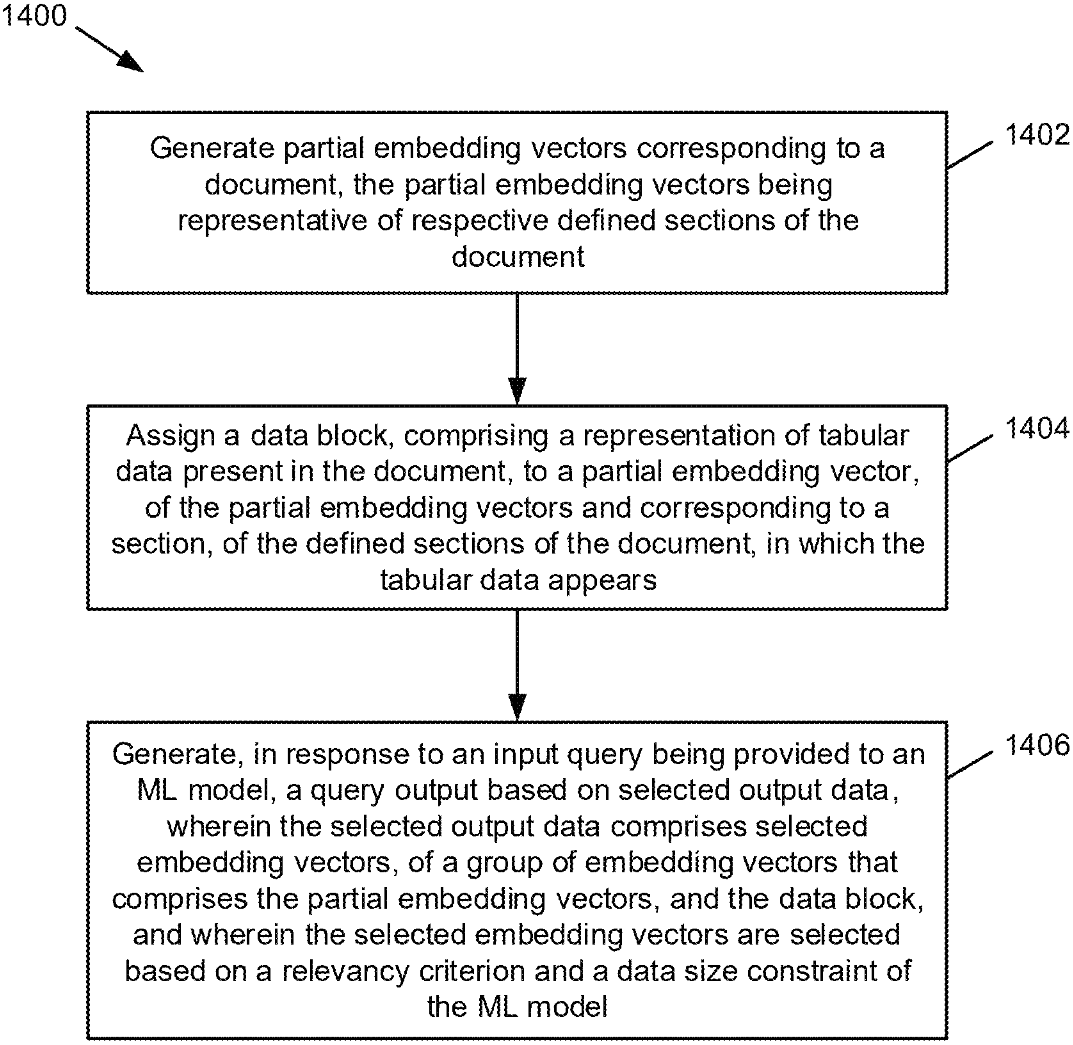

Referring next to FIG. 14, a flow diagram of a method 1400 that can be performed by at least one processor, e.g., based on machine-executable instructions stored on a non-transitory machine-readable medium, is illustrated. An example of a computer architecture, including a processor and non-transitory media, that can be utilized to implement method 1400 is described below with respect to FIG. 15.

Method 1400 can begin at 1402, in which the at least one processor can generate partial embedding vectors corresponding to a document, the partial embedding vectors being representative of respective defined sections of the document.

At 1404, the at least one processor can assign a data block, comprising a representation of tabular data present in the document, to a partial embedding vector, of the partial embedding vectors and corresponding to a section, of the defined sections of the document, in which the tabular data appears.

At 1406, in response to an input query being provided to an ML model, the at least one processor can generate a query output based on selected output data, wherein the selected output data comprises selected embedding vectors, of a group of embedding vectors that comprises the partial embedding vectors, and the data block, and wherein the selected embedding vectors are selected based on a relevancy criterion and a data size constraint of the ML model.

FIGS. 13-14 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 15:
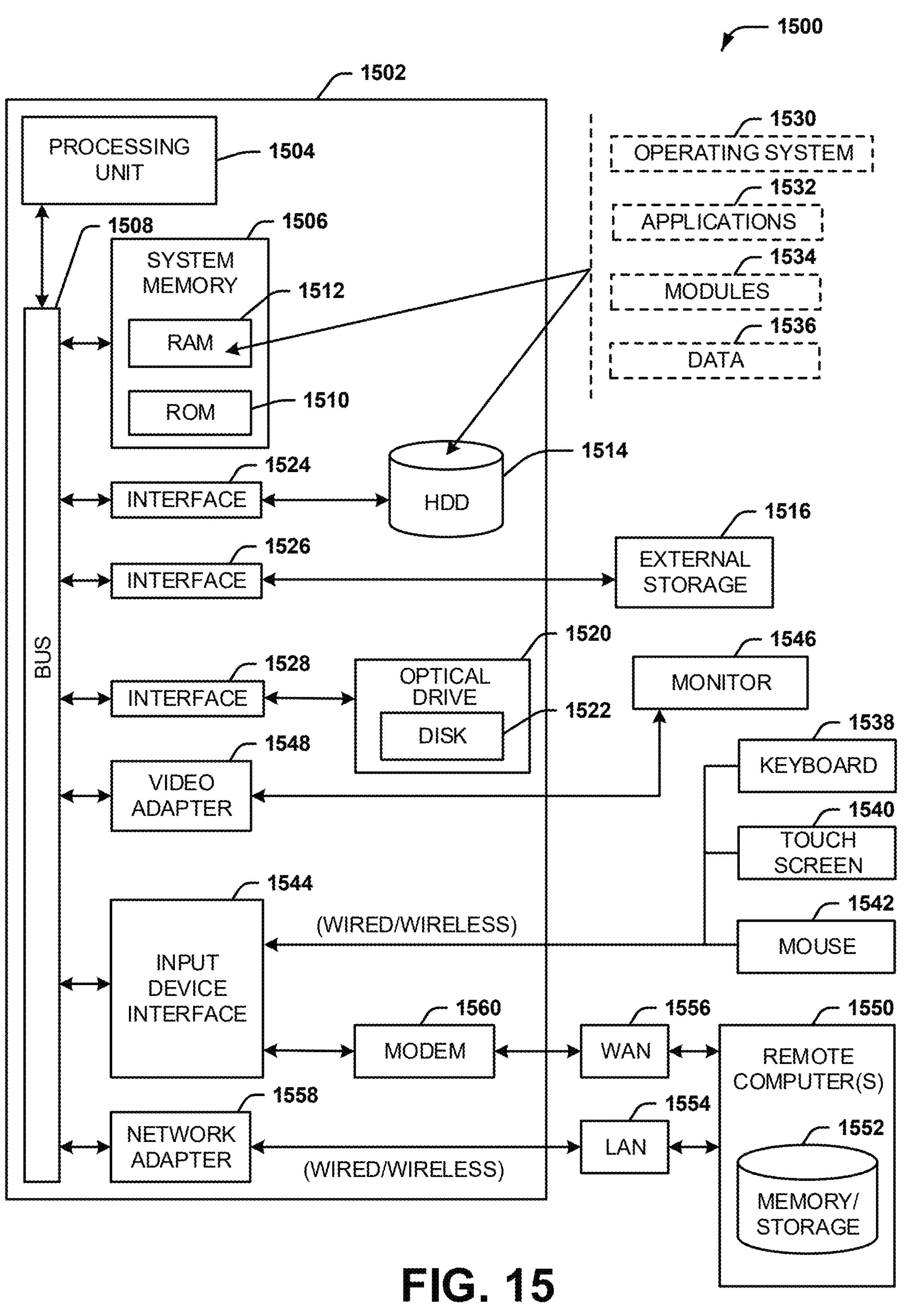
FIG. 15 is a diagram of an example computing environment in which various implementations described herein can function.

In order to provide additional context for various embodiments described herein, FIG. 15 and the following discussion are intended to provide a brief, general description of a suitable computing environment 1500 in which the various embodiments of the embodiment described herein can be implemented. While implementations have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference now to FIG. 15, an example general-purpose environment 1500 for implementing various embodiments described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD), a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are examples and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, the operations comprising:

generating partial embeddings from a document, the partial embeddings being representative of respective subdivisions of the document;

storing the partial embeddings in an embedding data store;

assigning a data block, comprising a representation of tabular data present in the document and stored in the embedding data store, to a partial embedding, of the partial embeddings and corresponding to a subdivision, of the subdivisions of the document, in which the tabular data appears; and in response to an input query to a machine learning model, generating a query output based on selected output data comprising selected embeddings, of a group of embeddings and comprising the partial embedding, and the data block, the generating of the query output comprising transferring the selected output data from the embedding data store to the machine learning model and generating the query output based on an output of the machine learning model, wherein the selected embeddings are selected based on a relevancy criterion, and wherein a total size of the selected output data is bounded by an input data size constraint of the machine learning model.

2. The system of claim 1, wherein the tabular data present in the document comprises a data table, and wherein the operations further comprise:

generating the data block from the data table; and storing the data block in the embedding data store.

3. The system of claim 2, wherein the generating of the data block comprises splitting a merged cell in the data table into a group of unmerged cells and duplicating contents of the merged cell into respective ones of the group of unmerged cells.

4. The system of claim 2, wherein the generating of the data block comprises replacing non-text information, present in the data table and selected from a group of information types comprising a symbol and a cell color, with a text representation of the non-text information based on context information associated with the document.

5. The system of claim 2, wherein the data table is a first data table, wherein the tabular data present in the document further comprises a second data table, and wherein the generating of the data block comprises:

identifying a relationship between the first data table and the second data table based on context information associated with the document, merging the first data table and the second data table based on the relationship, resulting in a merged data table, and generating the data block from the merged data table.

6. The system of claim 1, wherein the group of embeddings further comprises a summary embedding, representative of a generative summary of the document, and a full embedding, representative of an entirety of the document.

7. The system of claim 1, wherein the operations further comprise:

assigning, based on the input query, relevancy scores for the input query to respective embeddings of the group of embeddings and the data block, wherein the relevancy criterion comprises maximization of a total relevancy score of the selected output data subject to the input data size constraint of the machine learning model.

8. The system of claim 7, wherein the assigning of the relevancy scores comprises assigning the relevancy scores as weighted sums of a group of relevancy metrics respectively applied to the respective embeddings of the group of embeddings and the data block.

9. The system of claim 7, wherein the operations further comprise:

determining a group of candidate embeddings for the query output based on a result of a linear programming process, applied to the respective embeddings of the group of embeddings and the data block and based on the relevancy scores for the input query; and selecting, from the group of candidate embeddings and the data block, the selected output data.

10. The system of claim 9, wherein the selected embeddings comprise less than all of the group of candidate embeddings, and wherein the selected embeddings are selected from the group of candidate embeddings according to a bounding function.

11. A method, comprising:

generating, by a system comprising at least one processor, partial vector embeddings from a document, the partial vector embeddings being representative of respective defined sections of the document;

storing, by the system, the partial vector embeddings in an embedding data store;

assigning, by the system, a data block, comprising a representation of tabular data present in the document and stored in the embedding data store, to a partial vector embedding, of the partial vector embeddings and corresponding to a section, of the defined sections of the document, in which the tabular data appears; and generating, by the system and in response to an input query to a machine learning model, a query output based on selected output data, wherein the selected output data comprises selected vector embeddings, of a group of vector embeddings that comprises the partial vector embeddings, and the data block, the generating of the query output comprising transferring the selected output data from the embedding data store to the machine learning model and generating the query output based on an output of the machine learning model, wherein the selected vector embeddings are selected based on a relevancy criterion, and wherein a total size of the selected output data is bounded by an input data size constraint of the machine learning model.

12. The method of claim 11, wherein the tabular data present in the document comprises a table, and wherein the method further comprises:

generating, by the system, the data block from the table; and storing, by the system, the data block in the embedding data store.

13. The method of claim 12, wherein the table is a first table, wherein the tabular data present in the document further comprises a second table, and wherein the generating of the data block comprises:

identifying a relationship between the first table and the second table based on context information associated with the document, merging the first table and the second table based on the relationship, resulting in a merged table, and generating the data block from the merged table.

14. The method of claim 11, wherein the group of vector embeddings further comprises a summary vector embedding, representative of a generative summary of the document, and a full vector embedding, representative of an entirety of the document.

15. The method of claim 11, further comprising:

assigning, by the system and based on the input query, relevancy scores for the input query to respective vector embeddings of the group of vector embeddings and the data block, wherein the relevancy criterion comprises maximization of a total relevancy score of the selected output data subject to the input data size constraint of the machine learning model.

16. The method of claim 15, further comprising:

determining, by the system, a group of candidate vector embeddings for the query output based on a result of a linear programming process, applied to the respective vector embeddings of the group of vector embeddings and based on the relevancy scores for the input query; and selecting, by the system and from the group of candidate vector embeddings and the data block, the selected output data.

17. A non-transitory machine-readable medium comprising computer executable instructions that, when executed by at least one processor, facilitate performance of operations, the operations comprising:

generating partial embedding vectors corresponding to a document, the partial embedding vectors being representative of respective defined sections of the document;

storing the partial embedding vectors in an embedding data store;

assigning a data block, comprising a representation of tabular data present in the document and stored in the embedding data store, to a partial embedding vector, of the partial embedding vectors and corresponding to a section, of the defined sections of the document, in which the tabular data appears; and generating, in response to an input query being provided to a machine learning model, a query output based on selected output data, wherein the selected output data comprises selected embedding vectors, of a group of embedding vectors that comprises the partial embedding vectors, and the data block, the generating of the query output comprising transferring the selected output data from the embedding data store to the machine learning model and generating the query output based on an output of the machine learning model, wherein the selected embedding vectors are selected based on a relevancy criterion, and wherein a total size of the selected output data is bounded by an input data size constraint of the machine learning model.

18. The non-transitory machine-readable medium of claim 17, wherein the tabular data present in the document comprises a table, and wherein the operations further comprise:

generating the data block from the table; and storing the data block in the embedding data store.

19. The non-transitory machine-readable medium of claim 18, wherein the table is a first table, wherein the tabular data present in the document further comprises a second table, and wherein the generating of the data block comprises:

identifying a parent-child relationship between the first table and the second table based on context information associated with the document, merging the first table and the second table based on the parent-child relationship, resulting in a merged table, and generating the data block from the merged table.

20. The non-transitory machine-readable medium of claim 17, wherein the operations further comprise:

assigning value information (VI) scores for the input query to respective embedding vectors of the group of embedding vectors and the data block, wherein the relevancy criterion comprises maximization of a total VI score of the selected output data subject to the input data size constraint of the machine learning model;

determining a group of candidate embedding vectors for the query output based on linear programming, applied to the respective embedding vectors of the group of embedding vectors and the data block and based on the VI scores for the input query; and selecting, from the group of candidate embedding vectors and the data block, output data resulting in the selected output data.

* * * * *